S. NORO.
ATTACHMENT FOR HORSESHOES.
APPLICATION FILED JAN. 12, 1916.
1,194,774.
Patented Aug. 15, 1916.
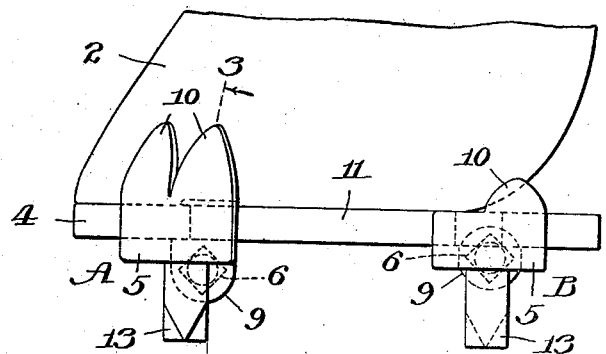
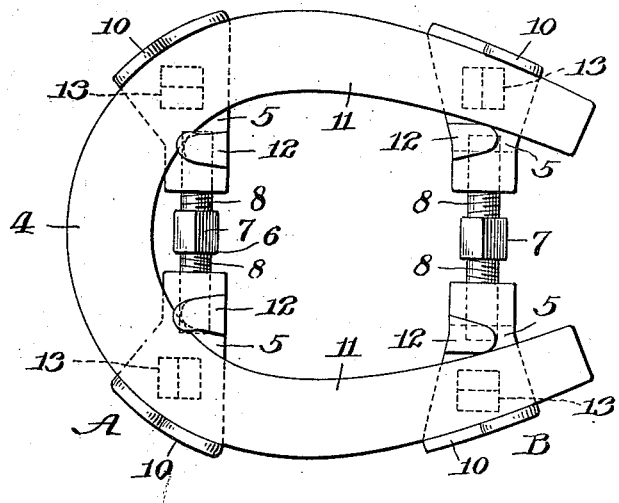
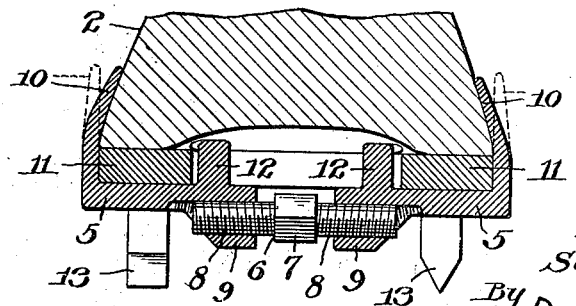
Inventor:
Seikichi Noro
By
Attorney

UNITED STATES PATENT OFFICE.

SEIKICHI NORO, OF PHILADELPHIA, PENNSYLVANIA.

ATTACHMENT FOR HORSESHOES.

1,194,774.

Specification of Letters Patent. Patented Aug. 15, 1916.

Application filed January 12, 1916. Serial No. 71,675.

*To all whom it may concern:*

Be it known that I, SEIKICHI NORO, a subject of the Emperor of Japan, residing at Philadelphia, in the county of Philadelphia and State of Pennsylvania, have invented certain new and useful Improvements in Attachments for Horseshoes, of which the following is a specification.

My invention relates to improvements in anti-slipping attachments for horseshoes.

The object of my invention is to provide a novel, inexpensive, simple and efficient attachment which may be readily applied to and removed from a horseshoe, and which, when applied, will be firmly held in place without liability of working loose.

With this object in view my invented attachment consists of the elements and the combinations of them hereinafter fully described and claimed.

In the accompanying drawings, illustrating my invention, Figure 1 is a side elevation of the lower portion of a horse's hoof having a horseshoe thereon and my improved attachment applied to the horseshoe. Fig. 2 is a top view of the parts shown in Fig. 1, omitting the hoof. Fig. 3 is a vertical section, on line 3—3 of Fig. 1.

Referring to the drawings, 2 designates a horse's hoof and 4 a horseshoe secured thereto. Extending transversely across the forward and rearward portions of the horseshoe 4 are two devices or attachments, A and B, respectively, which are constructed in accordance with my invention, and which are alike, excepting that some parts of one device are shaped differently from the similar parts of the other device to conform to the differently shaped forward and rearward portions of the horseshoe; and, therefore, one description will suffice for both devices or attachments, A and B, as follows: Each device or attachment A and B comprises two members or plates 5 which take against the bottom of the horseshoe, and an element 6 which connects the members 5. The element 6, in the present embodiment of my invention, comprises a square head 7 and two oppositely screw-threaded shanks extending from the respective sides of the head 7 and screwed into lugs 9 formed on the inner ends of the members 5. By turning the element 6 in one direction, the two members 5 may be drawn toward each other, and by turning the element 6 in the reverse direction the two members 5 may be forced apart. The outer ends of the members 5 are provided with upwardly extending parts 10 which are adapted to engage the outer faces of the side portions 11 of the horseshoe 4. The members 5 are also provided with upwardly extending projections 12 which are adapted to engage the inner faces of the side portions 11 of the horseshoe. The attachments A and B are secured to the horseshoe 4 by turning the element 6 to draw the members 5 toward each other, thereby drawing the parts 10 firmly against the outer faces of the side portions 11 of the horseshoe.

The parts 10 of the attachment A engage forwardly converging outer faces of the side portions 11 of the horseshoe, so that when the members 5 are drawn toward each other, the entire device is prevented from being thrust forwardly longitudinally of the horseshoe by the projections 12 which are forced against the forwardly converging inner faces of the side portions 11 of the horseshoe.

The parts 10 of the attachment B engage rearwardly converging outer faces of the side portions 11 of the horseshoe, so that when the members 5 are drawn toward each other, the entire device is prevented from being thrust rearwardly longitudinally of the horseshoe by the projections 12 which are forced against the rearwardly converging inner faces of the side portions 11 of the horseshoe.

The parts 10 of the attachment B engage rearwardly converging outer faces of the side portions 11 of the horseshoe, so that when the members 5 are drawn toward each other, the entire device is prevented from being thrust rearwardly longitudinally of the horseshoe by the projections 12 which are forced against the rearwardly converging inner faces of the side portions 11 of the horseshoe.

The parts 10 of the members 5 are formed of malleable metal, and, normally, they extend substantially perpendicular to the members 5, as shown by dotted lines in Fig. 3, to permit the application of the attachments to the horseshoe; and after the same have been applied, the parts 10 are bent or swaged inwardly, to the position shown by full lines in Fig. 3, to extend over the horseshoe and lie close to the hoof 2 to prevent the attachments from working loose.

The parts 10 of the forward device A are bifurcated, as shown, so that the same may be bent or swaged to a correct fit notwithstanding the curved form thereof shaped to fit the curved horseshoe with which they are engaged.

The upwardly extending projections 12 of the forward device A have forwardly extending upper portions as shown to fit over the horseshoe 4 and thus assist in preventing the attachment from working loose.

The bottoms of the members 5 are provided with suitable downwardly-extending anti-slipping calks 13, as shown.

I claim:

1. In an attachment for horseshoes, a pair of side members adapted to engage the bottom of the side portions of a horseshoe, and means connecting said members and operative to draw them toward each other, said members having upwardly extending parts adapted to engage the outer converging faces of said side portions, and said members having upwardly extending projections adapted to engage the inner converging faces of said side members and prevent displacement of the attachment longitudinally of the horseshoe when said members are drawn toward each other.

2. In an attachment for horseshoes, a pair of side members adapted to engage the bottom of the side portions of a horseshoe, and an element having screw threaded end portions screwed into said members and operative to draw them toward each other, said members having upwardly extending parts adapted to engage the outer converging faces of said side portions, and said members having upwardly extending projections adapted to engage the inner converging faces of said side members and prevent displacement of the attachment longitudinally of the horseshoe when said members are drawn toward each other.

3. In an attachment for horseshoes, a pair of side members adapted to engage the bottom of the side portions of a horseshoe, and means connecting said members and operative to draw them toward each other, said members having upwardly extending parts adapted to engage the outer converging faces of said side portions, said members having upwardly extending projections adapted to engage the inner converging faces of said side members and prevent displacement of the attachment longitudinally of the horseshoe when said members are drawn toward each other, and said upwardly extending parts being constructed of malleable metal and being adapted to be bent inwardly to extend over the horseshoe after the application of the attachment thereto.

4. In an attachment for horseshoes, a pair of side members adapted to engage the bottom of the side portions of a horseshoe, and means connecting said members and operative to draw them toward each other, said members having upwardly extending parts adapted to engage the outer converging faces of said side portions, said members having upwardly extending projections adapted to engage the inner converging faces of said side members and prevent displacement of the attachment longitudinally of the horseshoe when said members are drawn toward each other, and said projections having forwardly extending upper end portions adapted to fit over a horseshoe.

In testimony whereof I affix my signature hereto.

SEIKICHI NORO.

Copies of this patent may be obtained for five cents each, by addressing the "Commissioner of Patents, Washington, D. C."